(12) United States Patent
Yamamoto et al.

(10) Patent No.: US 10,822,708 B2
(45) Date of Patent: Nov. 3, 2020

(54) WATER ELECTROLYSIS APPARATUS

(71) Applicant: HONDA MOTOR CO., LTD., Minato-ku, Tokyo (JP)

(72) Inventors: Kazuhiro Yamamoto, Wako (JP); Mikiya Kobayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 9 days.

(21) Appl. No.: 16/247,687

(22) Filed: Jan. 15, 2019

(65) Prior Publication Data

US 2019/0218670 A1 Jul. 18, 2019

(30) Foreign Application Priority Data

Jan. 16, 2018 (JP) ................. 2018-004713

(51) Int. Cl.
 C25B 1/04 (2006.01)
 C25B 9/06 (2006.01)
 C25B 1/12 (2006.01)
 C25B 9/10 (2006.01)
 C25B 9/18 (2006.01)
 C25B 9/04 (2006.01)

(52) U.S. Cl.
 CPC ............. *C25B 1/12* (2013.01); *C25B 9/04* (2013.01); *C25B 9/10* (2013.01); *C25B 9/18* (2013.01); *C02F 2201/46115* (2013.01)

(58) Field of Classification Search
 CPC .... C25B 9/18; C25B 1/04; C25B 9/00; C25B 9/06
 USPC .......................................... 204/257
 See application file for complete search history.

(56) References Cited

U.S. PATENT DOCUMENTS

| 9,828,682 B2 | 11/2017 | Kawasaki et al. |
| 2011/0132748 A1* | 6/2011 | Haryu ............ C25B 1/04 204/263 |
| 2016/0122885 A1 | 5/2016 | Ishikawa et al. |

(Continued)

FOREIGN PATENT DOCUMENTS

| JP | 2016-060944 A | 4/2016 |
| JP | 2016-089229 A | 5/2016 |

OTHER PUBLICATIONS

Office Action dated Oct. 1, 2019 issued over the corresponding Japanese Patent Application No. 2018-004713 and the English translation thereof.

(Continued)

*Primary Examiner* — Zulmariam Mendez
(74) *Attorney, Agent, or Firm* — Carrier Blackman & Associates, P.C.; Joseph P. Carrier; Jeffrey T. Gedeon

(57) ABSTRACT

A differential pressure type high pressure water electrolysis apparatus has a flow passage forming member for supplying water to an anode. In the flow passage forming member, there are formed a water receiving section for receiving water supplied from the exterior, a distributing path for distributing the water that has flowed into the water receiving section, a converging path into which a surplus supplied amount of water flows, and a water discharging section for receiving the water inside the converging path and discharging it to the exterior. The positions of the distributing path and the converging path are offset from an opposing position where a seal member faces toward a pressure resistant member that surrounds the seal member from the exterior.

4 Claims, 6 Drawing Sheets

(56) References Cited

U.S. PATENT DOCUMENTS

2016/0130708 A1   5/2016   Daimon et al.

OTHER PUBLICATIONS

Office Action including search report dated Jul. 15, 2020 issued over the corresponding Chinese Patent Application No. 201910035996.2 with the English translation thereof.

* cited by examiner

WATER ELECTROLYSIS APPARATUS

CROSS-REFERENCE TO RELATED APPLICATION

This application is based upon and claims the benefit of priority from Japanese Patent Application No. 2018-004713 filed on Jan. 16, 2018, the contents of which are incorporated herein by reference.

BACKGROUND OF THE INVENTION

Field of the Invention

The present invention relates to a water electrolysis apparatus which generates oxygen and hydrogen by electrolysis of water.

Description of the Related Art

A water electrolysis apparatus is well known as a device that subjects water to electrolysis to thereby generate hydrogen (and oxygen). The obtained hydrogen is supplied, for example, to a fuel cell in which the hydrogen is used as a fuel gas.

In greater detail, such a water electrolysis apparatus includes an electrolyte electrode assembly, for example, a membrane electrode assembly (MEA), in which an anode electrode catalyst layer is formed on one surface of an electrolyte membrane made of a solid polymer, and a cathode electrode catalyst layer is formed on the other surface thereof. The membrane electrode assembly is sandwiched between power feeding bodies which are disposed respectively on outer sides of the anode electrode catalyst layer and the cathode electrode catalyst layer. When power is supplied to the membrane electrode assembly via the power feeding bodies, the water is subjected to electrolysis in the anode electrode catalyst layer, thereby generating hydrogen ions (protons) and oxygen. The protons thereamong permeate through the electrolyte membrane, migrate to the cathode electrode catalyst layer, and are combined with electrons, whereupon they are converted into hydrogen. On the other hand, the oxygen generated in the anode electrode catalyst layer is discharged together with surplus water from the water electrolysis apparatus.

In this instance, cases are known to occur in which the hydrogen generated in the cathode electrode catalyst layer is obtained at a higher pressure in comparison with the oxygen generated in the anode electrode catalyst layer. This type of water electrolysis apparatus is known as a differential pressure type high pressure water electrolysis apparatus. In such a differential pressure type high pressure water electrolysis apparatus, because the internal pressure on the side of the cathode is increased, on the cathode side, there are provided a seal member (for example, an o-ring) for preventing leakage of hydrogen, and a pressure resistant member that surrounds the seal member from the exterior thereof.

As disclosed in Japanese Laid-Open Patent Publication No. 2016-089229, in such a water electrolysis apparatus, there is further included a flow passage forming member (referred to as a "water plate member" in Japanese Laid-Open Patent Publication No. 2016-089229) in which a flow passage is formed for delivering externally supplied water to an anode electrode catalyst layer. The flow passage includes a water receiving section that receives the water, supply passages for supplying the water to the anode electrode catalyst layer, and a water discharging section that discharges unelectrolyzed water in a surplus supplied amount, wherein an arcuately shaped distributing path and an arcuately shaped converging path are disposed in an intervening manner between the water receiving section and the supply passages, and between the supply passages and the water discharging section.

SUMMARY OF THE INVENTION

A principal object of the present invention is to provide a water electrolysis apparatus, which is capable of avoiding the occurrence of a large deflection in a electrolyte membrane or the like, even in the case that a pressing force of a seal member against a pressure resistant member and the electrolyte membrane becomes increased by hydrogen being generated at an extremely high pressure.

According to an embodiment, there is provided a water electrolysis apparatus, comprising:
an anode side separator;
a cathode side separator;
a membrane electrode assembly constituted by providing an anode electrode catalyst layer and a cathode electrode catalyst layer on an electrolyte membrane, and which is positioned between the anode side separator and the cathode side separator;
an anode power feeding body adapted to apply electric power to the anode electrode catalyst layer;
a cathode power feeding body adapted to apply electric power to the cathode electrode catalyst layer;
a seal member sandwiched between the cathode side separator and the membrane electrode assembly, and surrounding the cathode electrode catalyst layer; and
a pressure resistant member that surrounds the seal member from an outer side thereof;
the water electrolysis apparatus further comprising a flow passage forming member in which there are formed a water receiving section adapted to receive water supplied from the exterior, a plurality of supply passages adapted to individually supply the water to the anode electrode catalyst layer, a distributing path joined to the water receiving section and the plurality of supply passages, and adapted to distribute the water to the plurality of supply passages, a water discharging section adapted to discharge unelectrolyzed water to the exterior, and a converging path joined to the plurality of supply passages and the water discharging section, and adapted to converge the unelectrolyzed water;
wherein the distributing path and the converging path are disposed at positions offset from the seal member, when viewed in a cross section perpendicular to a direction in which the membrane electrode assembly is sandwiched by the anode side separator and the cathode side separator of the water electrolysis apparatus.

More specifically, in such a configuration, the distributing path and the converging path are located at positions that do not overlap with the seal member. Stated otherwise, an end surface of the flow path forming member overlaps with respect to the seal member. Therefore, when the seal member is pressed from the inner circumferential side thereof by hydrogen that is generated at a high pressure, and thereby, the seal member is pressed against the pressure resistant member and the electrolyte membrane, the electrolyte membrane is supported by the flow passage forming member. Accordingly, even if the hydrogen is at a high pressure, a large elastic deformation (deflection) is unlikely to occur in the electrolyte membrane and the flow passage forming member.

Therefore, lowering of the contact surface pressure between the pressure resistant member and the electrolyte membrane is avoided. Accordingly, it is possible to prevent a situation in which the seal member, which is pressed against the pressure resistant member under the pressure of the hydrogen, enters into a clearance between the pressure resistant member and the electrolyte membrane, or in other words, entry (pushing out) of the seal member between the pressure resistant member and the electrolyte membrane can be suppressed. Consequently, it is possible to prevent damage from occurring to the seal member in a manner that impairs airtightness.

The distributing path and the converging path, for example, may be located more outwardly than a position where the seal member and the pressure resistant member face toward each other. In this case, deflection can be effectively suppressed.

The distributing path and the converging path preferably are located more outwardly than an outer circumferential edge portion of the membrane electrode assembly. This is because, in accordance with this feature, bending or deflection of the membrane electrode assembly is further suppressed.

The distributing path and the converging path preferably are formed in an arcuate shape. By adopting such a shape, water can be supplied substantially uniformly and in a sufficient amount to the entire anode (the anode power feeding body and the anode electrode catalyst layer).

According to the present invention, the distributing path and the converging path, which are portions of the flow passage formed by the flow passage forming member and through which water to be subjected to electrolysis flows, are disposed at offset positions which do not overlap with the seal member that seals the cathode (the cathode power feeding body and the cathode electrode catalyst layer). For this reason, since the flow passage forming member supports the electrolyte membrane, when the seal member is pressed from the inner circumferential side and is pressed against the pressure resistant member and the electrolyte membrane, it becomes unlikely for a large elastic deformation (deflection) to occur in the electrolyte membrane and the flow passage forming member.

As a result, lowering of the contact surface pressure between the pressure resistant member and the electrolyte membrane is avoided. Accordingly, it is possible to prevent a situation in which the seal member, which has received the pressure of the hydrogen, enters (is pushed out) into a clearance between the pressure resistant member and the electrolyte membrane. Consequently, the seal member is prevented from being damaged.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a water electrolysis apparatus according to the present invention will be presented and described in detail below with reference to the accompanying drawings.

Figure 1:
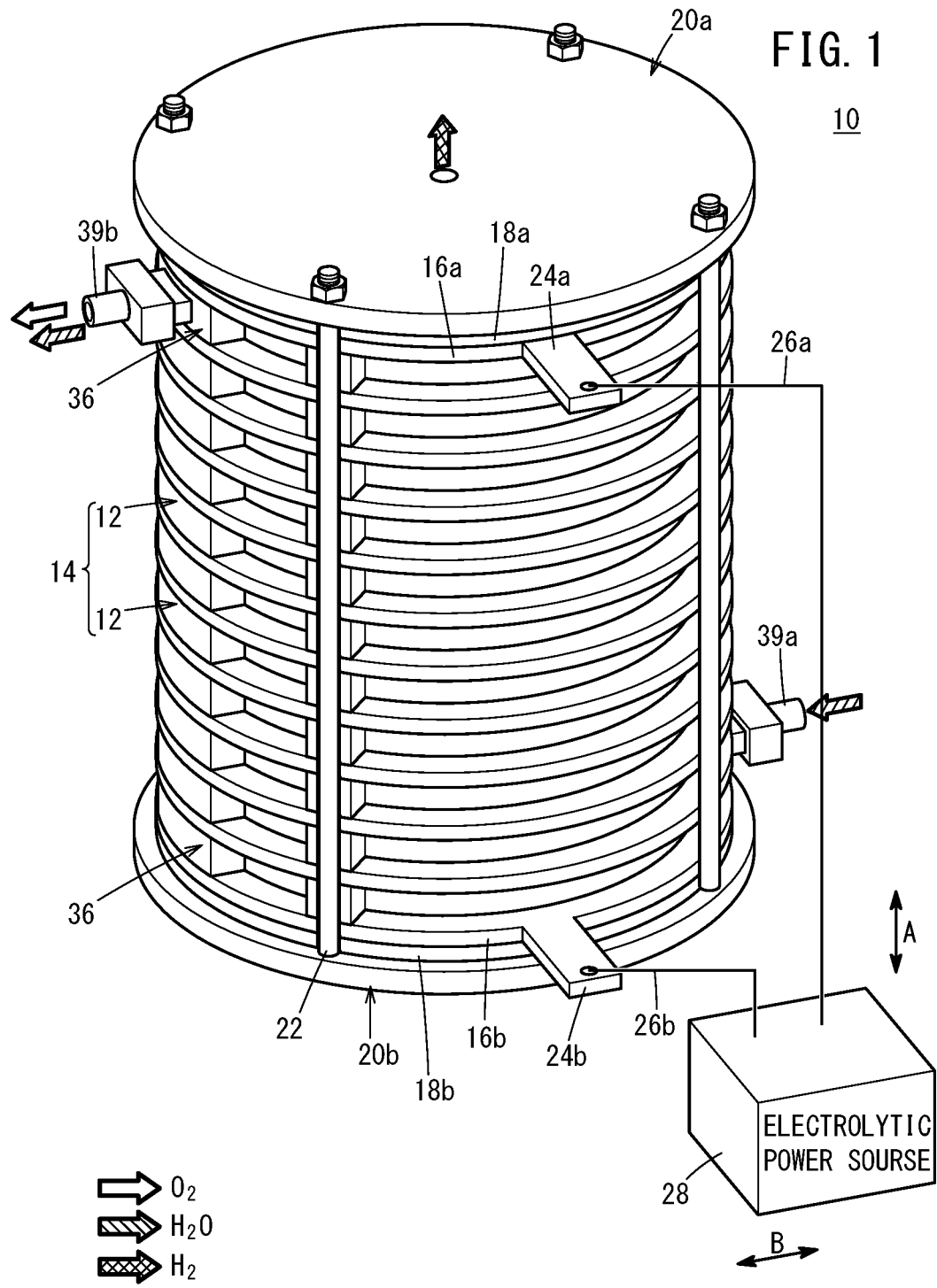
FIG. 1 is a schematic overall perspective view of a differential pressure type high pressure water electrolysis apparatus according to an embodiment of the present invention.

FIG. 1 is a schematic overall perspective view of a differential pressure type high pressure water electrolysis apparatus 10 (water electrolysis apparatus) according to an embodiment of the present invention. The differential pressure type high pressure water electrolysis apparatus 10 comprises a stacked body 14 in which a plurality of high pressure water electrolysis cells 12 are stacked. In FIG. 1, the high pressure water electrolysis cells 12 are stacked in a vertical direction (in the direction of the arrow A), however, the high pressure water electrolysis cells 12 may be stacked in a horizontal direction (in the direction of the arrow B). In this manner, in the present embodiment, the direction in which each of the constituent elements is superimposed is defined as a stacking direction.

A terminal plate 16a, an insulating plate 18a, and an end plate 20a, each having a substantially disc-like shape, are sequentially arranged in an upward direction from below at one end (upper end) in the stacking direction of the stacked body 14. Similarly, a terminal plate 16b, an insulating plate 18b, and an end plate 20b, each having a substantially disc-like shape, are sequentially arranged in a downward direction from above at the other end (lower end) in the stacking direction of the stacked body 14.

In the differential pressure type high pressure water electrolysis apparatus 10, the end plates 20a and 20b are integrally tightened and held by four tie rods 22 extending in the direction of the arrow A, and are fastened in the stacking direction. Moreover, the differential pressure type high pressure water electrolysis apparatus 10 may also be retained together integrally by a box-like casing (not shown) including the end plates 20a and 20b as end plates thereof. Further, although the differential pressure type high pressure water electrolysis apparatus 10 has a substantially cylindrical columnar shape as a whole, the overall shape thereof can be set to any of various shapes, such as a cubic shape.

Terminal portions 24a and 24b are provided in an outwardly projecting manner on side portions of the terminal plates 16a and 16b. The terminal portions 24a and 24b are electrically connected via conductive wirings 26a and 26b to an electrolytic power source 28.

Figure 2:
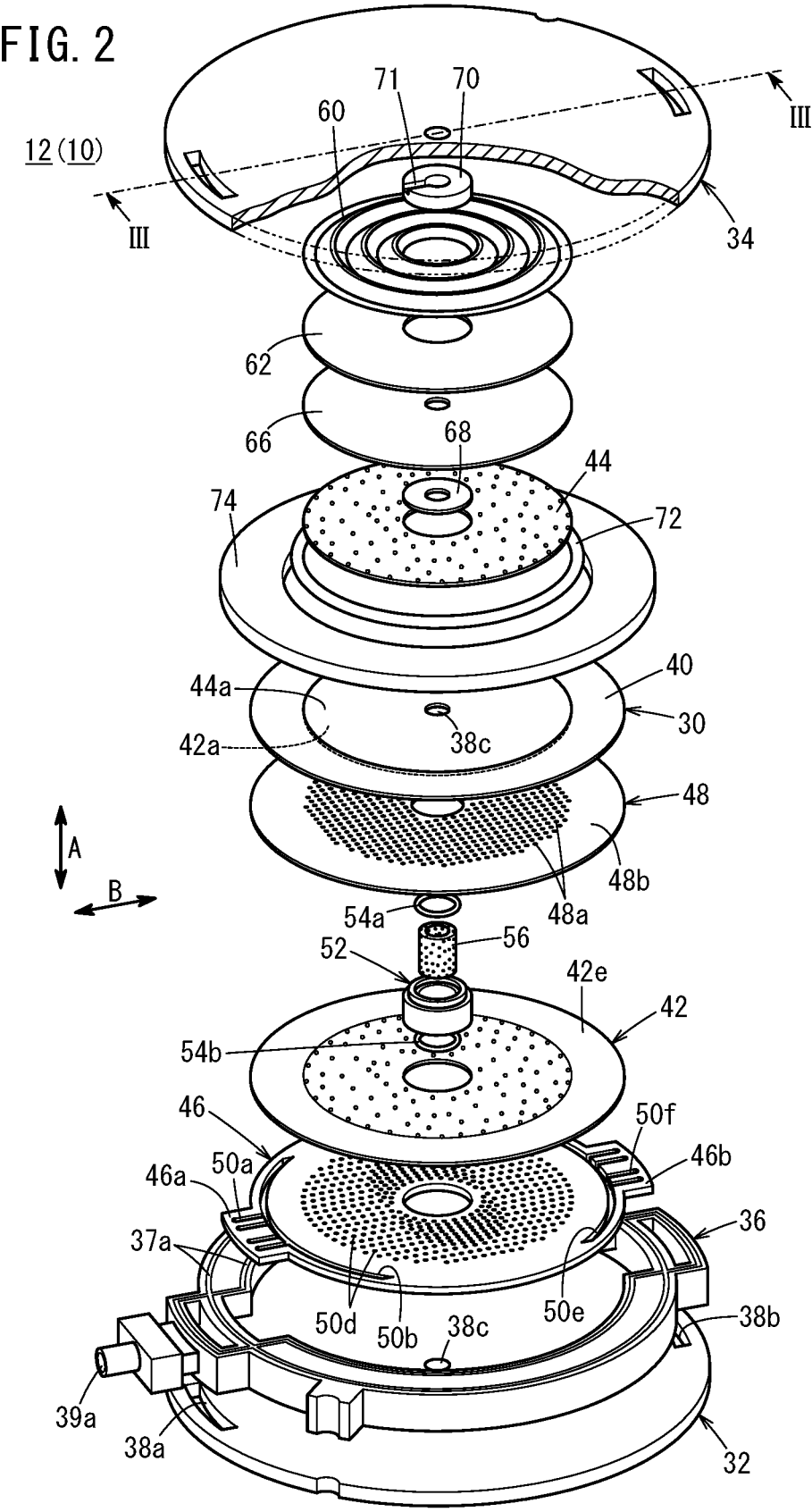
FIG. 2 is an exploded perspective view of a high pressure water electrolysis cell that constitutes part of the differential pressure type high pressure water electrolysis apparatus of FIG. 1.
Figure 3:
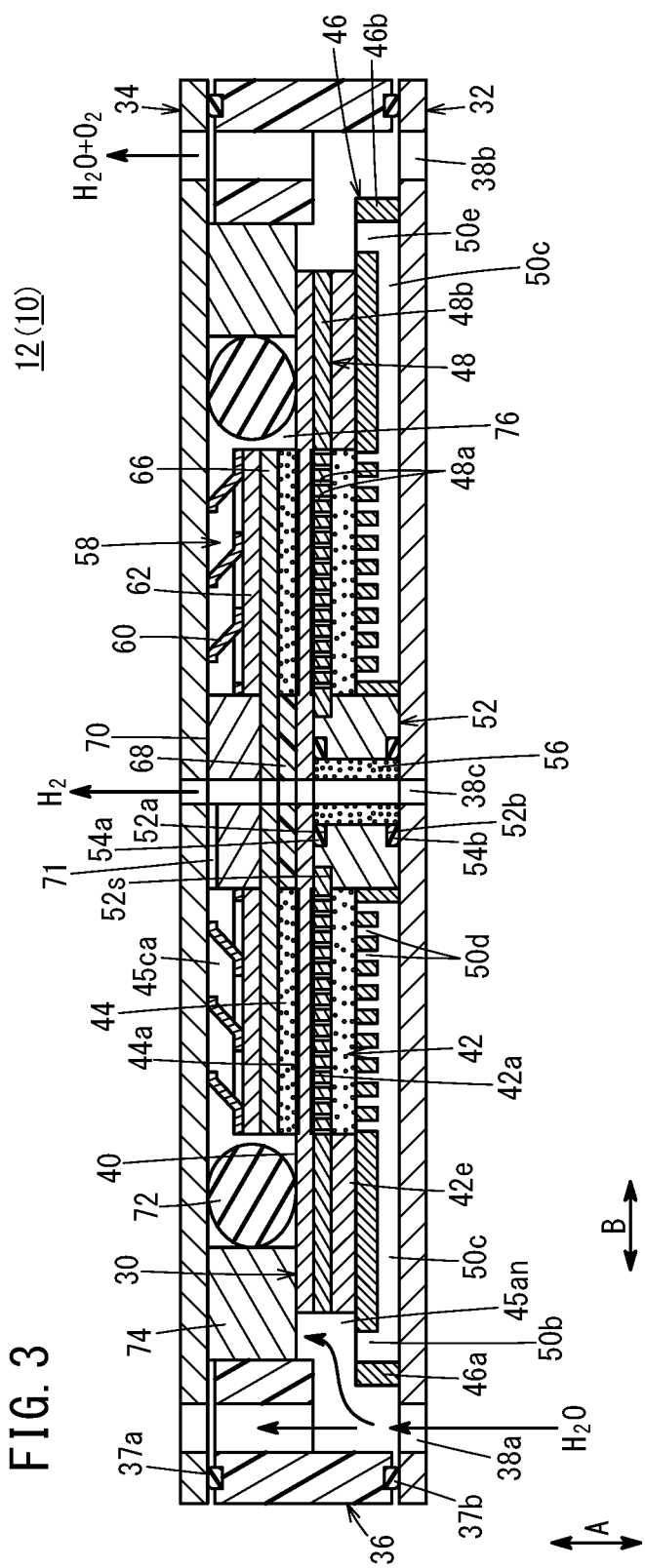
FIG. 3 is a cross-sectional view taken along line III-III in FIG. 2.

As shown in FIGS. 2 and 3, each of the high pressure water electrolysis cells 12 includes a substantially disc-shaped membrane electrode assembly 30, and an anode side separator 32 and a cathode side separator 34 which sandwich the electrolyte membrane electrode assembly 30 therebetween. The direction in which the membrane electrode assembly 30 is sandwiched by the anode side separator 32 and the cathode side separator 34 is the A direction (stacking direction).

A resin frame member 36 having a substantially annular shape is disposed between the anode side separator 32 and the cathode side separator 34. The membrane electrode assembly 30 is accommodated in a hollow interior portion of the resin frame member 36.

Seal members 37a and 37b are provided on the upper opening bottom portion and the lower opening bottom portion of the resin frame member 36. The anode side separator 32 and the cathode side separator 34 close the upper opening bottom portion and the lower opening bottom portion of the resin frame member 36, respectively, via the seal members 37a and 37b.

On one end in a diametrical direction of the resin frame member 36, a water supplying communication hole 38a for supplying water (pure water) is provided in mutual communication therewith in the stacking direction (the direction of the arrow A). Further, on the other end in the diametrical direction of the resin frame member 36, a water discharging communication hole 38b is provided for discharging the oxygen generated by the reaction and unreacted water (a mixed fluid).

As shown in FIG. 1, a water supply port 39a communicating with the water supplying communication hole 38a is connected to a side portion of the resin frame member 36, which is arranged in a lowermost location in the stacking direction. Further, a water discharge port 39b communicating with the water discharging communication hole 38b (see FIG. 3) is connected to a side portion of the resin frame member 36, which is arranged in an uppermost location in the stacking direction.

In a central portion of each of the high pressure water electrolysis cells 12, a high pressure hydrogen communication hole 38c is provided (see FIGS. 2 and 3) which penetrates through substantially the center of an electrolysis region, and communicates mutually therewith in the stacking direction. The high pressure hydrogen communication hole 38c discharges high pressure hydrogen having a pressure (for example, from 1 MPa to 80 MPa) generated by the reaction, and which is higher in pressure than that of the oxygen generated by the same reaction.

The anode side separator 32 and the cathode side separator 34 each have a substantially disc-like shape, and are constituted, for example, of a carbon member or the like. Apart therefrom, the anode side separator 32 and the cathode side separator 34 may be formed by press forming a steel plate, a stainless steel plate, a titanium plate, an aluminum plate, a steel plate subjected to a plating process, or alternatively, a metal plate subjected to an anti-corrosive surface treatment on the metal surface thereof. Alternatively, the anode side separator 32 and the cathode side separator 34 may also be formed by applying an anti-corrosive surface treatment after having carried out a cutting process.

The membrane electrode assembly 30 comprises an electrolyte membrane 40 made up from a solid polymer membrane having a substantially ring-like shape. The electrolyte membrane 40 is sandwiched between an anode power feeding body 42 and a cathode power feeding body 44 for electrolysis, which have a ring-like shape. The electrolyte membrane 40 is constituted from a hydrocarbon (HC)-based membrane or a fluorine-based solid polymer membrane, for example.

An anode electrode catalyst layer 42a having a ring-like shape is provided on one surface of the electrolyte membrane 40. A cathode electrode catalyst layer 44a having a ring-like shape is formed on the other surface of the electrolyte membrane 40. As the anode electrode catalyst layer 42a, there is used a ruthenium (Ru)-based catalyst, and as the cathode electrode catalyst layer 44a, there is used a platinum catalyst, for example. The high pressure hydrogen communication hole 38c is formed in a substantially central portion of the electrolyte membrane 40, the anode electrode catalyst layer 42a, and the cathode electrode catalyst layer 44a.

The anode power feeding body 42 and the cathode power feeding body 44 are constituted, for example, from a spherical gas atomizing titanium powder sintered compact (porous conductor), for example. The anode power feeding body 42 and the cathode power feeding body 44 are provided with a smooth surface portion on which an etching process is performed after grinding, and the porosity thereof is set within a range of 10% to 50%, and more preferably, within a range of 20% to 40%. A frame portion 42e is fitted onto an outer circumferential edge portion of the anode power feeding body 42. The frame portion 42e is constituted more densely than the anode power feeding body 42. Moreover, by constituting the outer circumferential portion of the anode power feeding body 42 densely, the outer circumferential portion can also serve as the frame portion 42e.

The hollow interior portion of the resin frame member 36 and the anode side separator 32 form an anode chamber 45an in which the anode power feeding body 42 is accommodated. On the other hand, the hollow interior portion of the resin frame member 36 and the cathode side separator 34 form a cathode chamber 45ca in which the cathode power feeding body 44 is accommodated.

A water flow passage member 46 that serves as a flow passage forming member is interposed (in the anode chamber 45an) between the anode side separator 32 and the anode power feeding body 42. As shown in FIG. 2, the water flow passage member 46 has a substantially disc-like shape, and an inlet protrusion 46a and an outlet protrusion 46b with a phase difference of roughly 180° are formed on an outer circumferential portion thereof.

A water flow passage for supplying water to be electrolyzed to the anode as well as discharging a surplus supplied amount of water is formed in the water flow passage member 46. The water flow passage is constituted to include, from an upstream side in the flow direction, a supply connection path 50a, a distributing path 50b, notch grooves 50c, holes 50d, a converging path 50e, and a discharge connection path 50f. Each of these constituent features will be described below.

The supply connection path 50a, which acts as a water receiving section for receiving the water supplied from the water supplying communication hole 38a, is formed in the inlet protrusion 46a. Furthermore, the distributing path 50b is connected to the supply connection path 50a. On the other hand, the converging path 50e is formed in the vicinity of the outlet protrusion 46b, together with the discharge connection path 50f (water discharging section), which is connected to the converging path 50e, being formed in the outlet protrusion 46b. The supply connection path 50a, the distributing path 50b, the converging path 50e, and the discharge connection path 50f penetrate along a thickness direction of the water flow passage member 46. Further, the distributing path 50b and the converging path 50e are formed in arcuate shapes by being curved along the outer circumferential edge portion of the water flow passage member 46.

Figure 4:
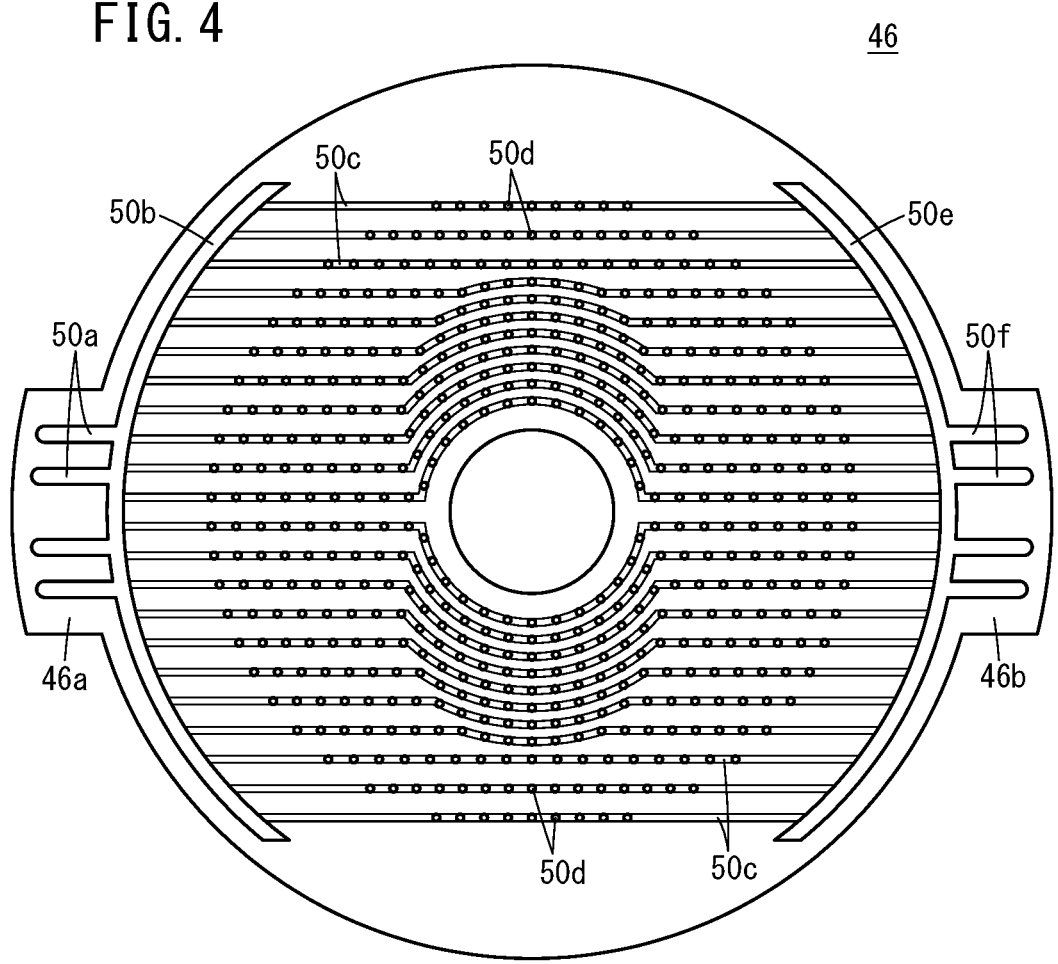
FIG. 4 is a schematic bottom view of a water flow passage member (flow passage forming member) that constitutes part of the high pressure water electrolysis cell.

As shown in FIG. 4, a plurality of notch grooves 50c that extend from the distributing path 50b toward the converging path 50e are formed on a lower surface of the water flow passage member 46 facing toward the anode side separator 32. A significant portion of the notch grooves 50c lie in parallel with respect to the diameter of the water flow passage member 46, however, other portions thereof are curved so as to bypass the high pressure hydrogen communication hole 38c. A height of the notch grooves 50c is roughly one-half the thickness of the water flow passage member 46.

On the other hand, on an upper surface of the water flow passage member 46 facing toward the membrane electrode assembly 30, a plurality of holes 50d are formed, which extend along the thickness direction and reach the notch grooves 50c. The holes 50d open toward the anode power feeding body 42. Since the distributing path 50b communicates with the notch grooves 50c, and furthermore, the notch grooves 50c communicate with the holes 50d, the water received by the supply connection path 50a passes through the distributing path 50b, the notch grooves 50c, and the holes 50d, and is supplied to the anode power feeding body 42. More specifically, the notch grooves 50c and the holes 50d function as supply passages for supplying water to the anode (the anode power feeding body 42 and the anode electrode catalyst layer 42a).

In the water flow passage member 46 having such a configuration, the distributing path 50b and the converging path 50e are located more outwardly than an opposing position where the large o-ring 72 and the pressure resistant member 74 face toward each other, together with being located more outwardly than the outer circumferential edge portion of the membrane electrode assembly 30.

The protective sheet member 48 is interposed between the anode power feeding body 42 and the anode electrode catalyst layer 42a. The inner circumference of the protective sheet member 48 is disposed inside the inner circumference of the anode power feeding body 42 and the cathode power feeding body 44, together with the outer circumferential position thereof being set at the same position as the outer circumferential positions of the electrolyte membrane 40, the anode power feeding body 42, and the water flow passage member 46. Further, the protective sheet member 48 has a plurality of through holes 48a provided within a range (electrolysis region) that faces toward the anode electrode catalyst layer 42a in the stacking direction, and includes a frame portion 48b on the outer side of the electrolysis region. Rectangular holes (not shown) are formed in the frame portion 48b.

Between the anode side separator 32 and the electrolyte membrane 40, a communication hole member 52 is provided, which surrounds the high pressure hydrogen communication hole 38c. The communication hole member 52 is formed in a substantially cylindrical shape, and seal chambers 52a and 52b having a shape that is cut out into a ring-like shape are provided at both axial ends thereof. Seal members (small o-rings) 54a and 54b which surround and seal the high pressure hydrogen communication hole 38c are disposed in the seal chambers 52a and 52b. A groove portion 52s on which the protective sheet member 48 is disposed is formed on an end surface of the communication hole member 52 that faces toward the electrolyte membrane 40.

A cylindrical porous member 56 is disposed between the high pressure hydrogen communication hole 38c and the seal chambers 52a and 52b. The high pressure hydrogen communication hole 38c is formed in a central portion of the porous member 56. The porous member 56 is interposed between the anode side separator 32 and the electrolyte membrane 40. The porous member 56 is formed by a ceramic porous body, a resin porous body, or a porous body made of a mixed material of ceramic and resin, however, apart therefrom, various other materials may be used.

As shown in FIGS. 2 and 3, a load applying mechanism 58 which presses the cathode power feeding body 44 toward the side of the electrolyte membrane 40 is disposed in the cathode chamber 45ca. The load applying mechanism 58 is constituted by an elastic member, for example, a plate spring 60, and the plate spring 60 applies a load to the cathode power feeding body 44 via a metal plate spring holder (shim member) 62. As the elastic member, in addition to the plate spring 60, a disc spring, a coil spring, or the like may be used.

A conductive sheet 66 is disposed between the cathode power feeding body 44 and the plate spring holder 62. The conductive sheet 66 is constituted, for example, from a metal sheet of titanium, SUS, iron, or the like, includes a ring-like shape, and is set to have substantially the same diameter as that of the cathode power feeding body 44.

In a central portion of the cathode power feeding body 44, an insulating member, for example, a resin sheet 68, is disposed between the conductive sheet 66 and the electrolyte membrane 40. The resin sheet 68 is fitted into an inner circumferential surface of the cathode power feeding body 44. The thickness of the resin sheet 68 is set to be substantially the same as that of the cathode power feeding body 44. As the resin sheet 68, for example, PEN (polyethylene naphthalate), a polyimide film, or the like may be used.

A communication hole member 70 is disposed between the resin sheet 68 and the cathode side separator 34. The communication hole member 70 has a cylindrical shape, and the high pressure hydrogen communication hole 38c is formed in a central portion thereof. At one end in the axial direction of the communication hole member 70, a hydrogen discharge passage 71 is formed that communicates with the cathode chamber 45ca and the high pressure hydrogen communication hole 38c.

In the cathode chamber 45ca, a large o-ring 72 (seal member) is arranged around the outer circumference of the cathode power feeding body 44, the plate spring holder 62, and the conductive sheet 66. A pressure resistant member 74 having a hardness which is higher than that of the large o-ring 72 is disposed on the outer circumference of the large o-ring 72. The pressure resistant member 74 has a substantially ring-like shape, together with the outer circumferential portion thereof being fitted into the inner circumferential portion of the resin frame member 36.

As shown in FIGS. 3 and 4, the inner circumferential wall of the large o-ring 72 is separated from the cathode power feeding body 44, the conductive sheet 66, the plate spring holder 62, and the plate spring 60. A clearance, which is generated by such a separation, becomes a pressure applying chamber 76 that forms a portion of the cathode chamber 45ca. When the hydrogen generated in the cathode electrode catalyst layer 44a enters into the cathode chamber 45ca, the hydrogen also enters into the pressure applying chamber 76, which makes up a portion of the cathode chamber 45ca.

The differential pressure type high pressure water electrolysis apparatus 10 according to the present embodiment is basically constructed in the manner described above. Next, advantageous effects thereof will be described in relation to operations of the differential pressure type high pressure water electrolysis apparatus 10.

When electrolysis of water is initiated, as shown in FIG. 1, the water is supplied from the water supply port 39a to the water supplying communication hole 38a, and a voltage is applied from the electrolytic power source 28 to the terminal portions 24a and 24b of the terminal plates 16a and 16b via the conductive wirings 26a and 26b. Therefore, as shown in FIG. 3, in each of the high pressure water electrolysis cells 12, water supplied from the exterior flows through the supply connection path 50a from the water supplying communication hole 38a, and reaches the distributing path 50b.

The distributing path 50b has an arcuate shape, and therefore, after having flowed along the distributing path 50b in the vicinity of the outer circumferential edge portion of the water flow passage member 46, the water flows respectively into the plurality of notch grooves 50c that are formed in the lower surface of the water flow passage member 46. In this manner, by the distributing path 50b being formed in an arcuate shape, flow resistance decreases, and it is possible to distribute the water substantially uniformly to the notch grooves 50c that make up the supply passages. Further, the amount of water becomes sufficient.

The water flows along the notch grooves 50c, and midway along the notch grooves 50c, the water is distributed individually to the plurality of holes 50d. The water having flowed into the holes 50d is supplied to the anode power feeding body 42 from the holes 50d, and moves into the interior of the anode power feeding body 42, which is a porous body.

The water further passes through the through holes 48a, and arrives at the anode electrode catalyst layer 42a. The water is subjected to electrolysis in the anode electrode catalyst layer 42a, and an anodic reaction is made to occur in which protons, electrons, and oxygen are generated. The protons thereamong permeate through the electrolyte membrane 40, migrate to the side of the cathode electrode catalyst layer 44a, and a cathodic reaction occurs in which the protons are combined with electrons. As a result, hydrogen as a gas phase is obtained.

Moreover, a surplus supplied amount of the water that has flowed through the notch grooves 50c without being distributed to the holes 50d flows into and is gathered in the converging path 50e. Since the converging path 50e is also formed in an arcuate shape, it is easy for the water that has flowed through the individual notch grooves 50c to be gathered therein. The water that is gathered in the converging path 50e is discharged, from the discharge connection path 50f and via the water discharge port 39b, to the exterior of the stacked body 14 together with oxygen generated by the anodic reaction.

On the other hand, the hydrogen flows to the cathode chamber 45ca along the hydrogen flow passage inside the cathode power feeding body 44, and furthermore, the hydrogen is discharged from the hydrogen discharge passage 71 into the high pressure hydrogen communication hole 38c. The hydrogen flows through the high pressure hydrogen communication hole 38c, in a state of being maintained at a higher pressure than the water supplying communication hole 38a, and can be taken out to the exterior of the differential pressure type high pressure water electrolysis apparatus 10.

Figure 5:
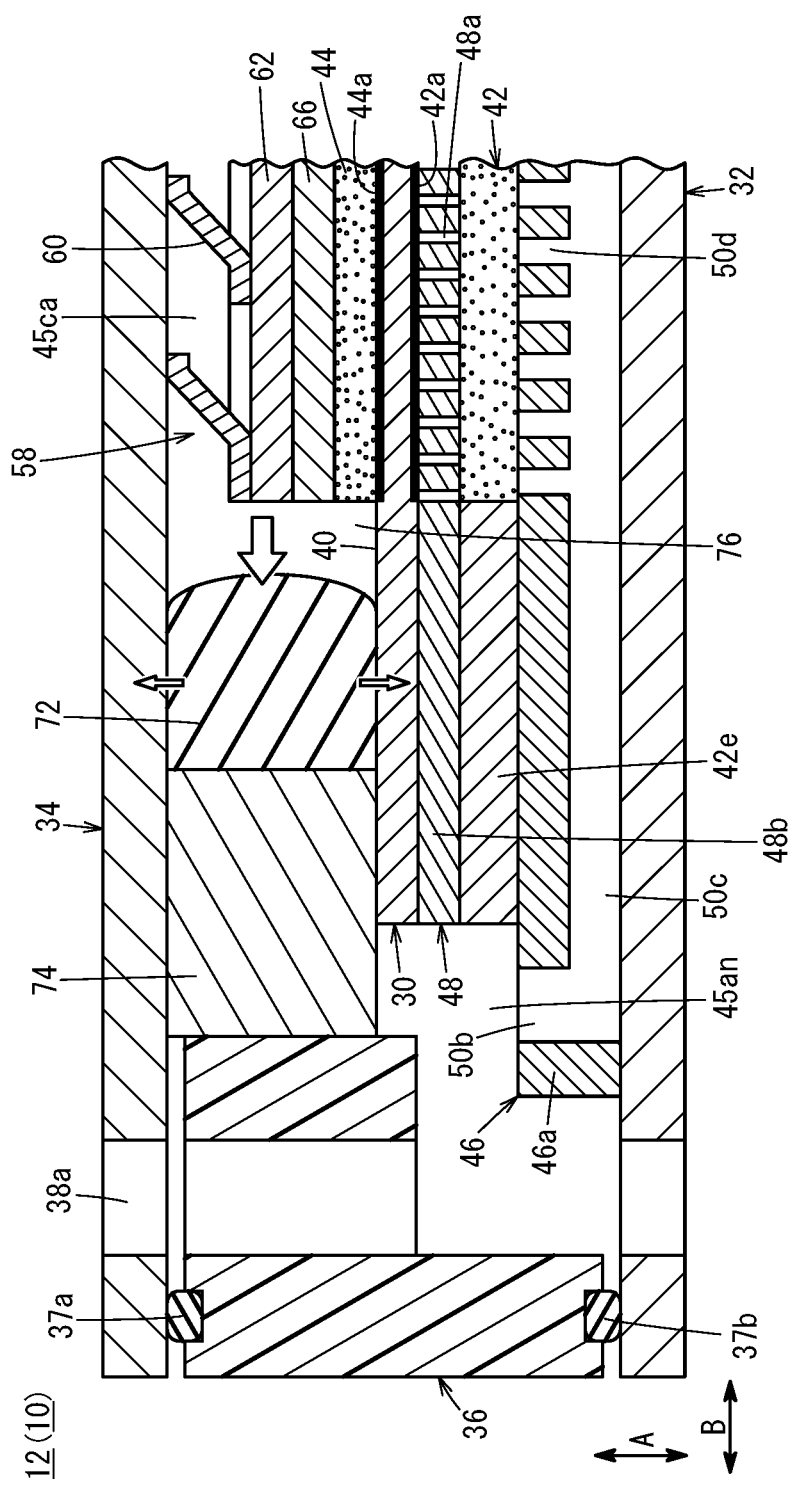
FIG. 5 is an enlarged cross-sectional view of principal parts showing a state in which, from the state thereof shown in FIG. 3, a large o-ring is pressed and compressed from the side of an inner circumferential wall thereof.

The hydrogen generated in the cathode electrode catalyst layer 44a fills the cathode chamber 45ca including the pressure applying chamber 76 thereof as high pressure hydrogen. Therefore, in each of the high pressure water electrolysis cells 12, as shown in FIG. 5, the large o-ring 72 is pressed toward the side of the pressure resistant member 74 while undergoing deformation. At this time, a pressing force in directions of the normal lines is generated from the large o-ring 72 with respect to the cathode side separator 34 and the electrolyte membrane 40, which are members that are sandwiched in the stacking direction.

Figure 6:
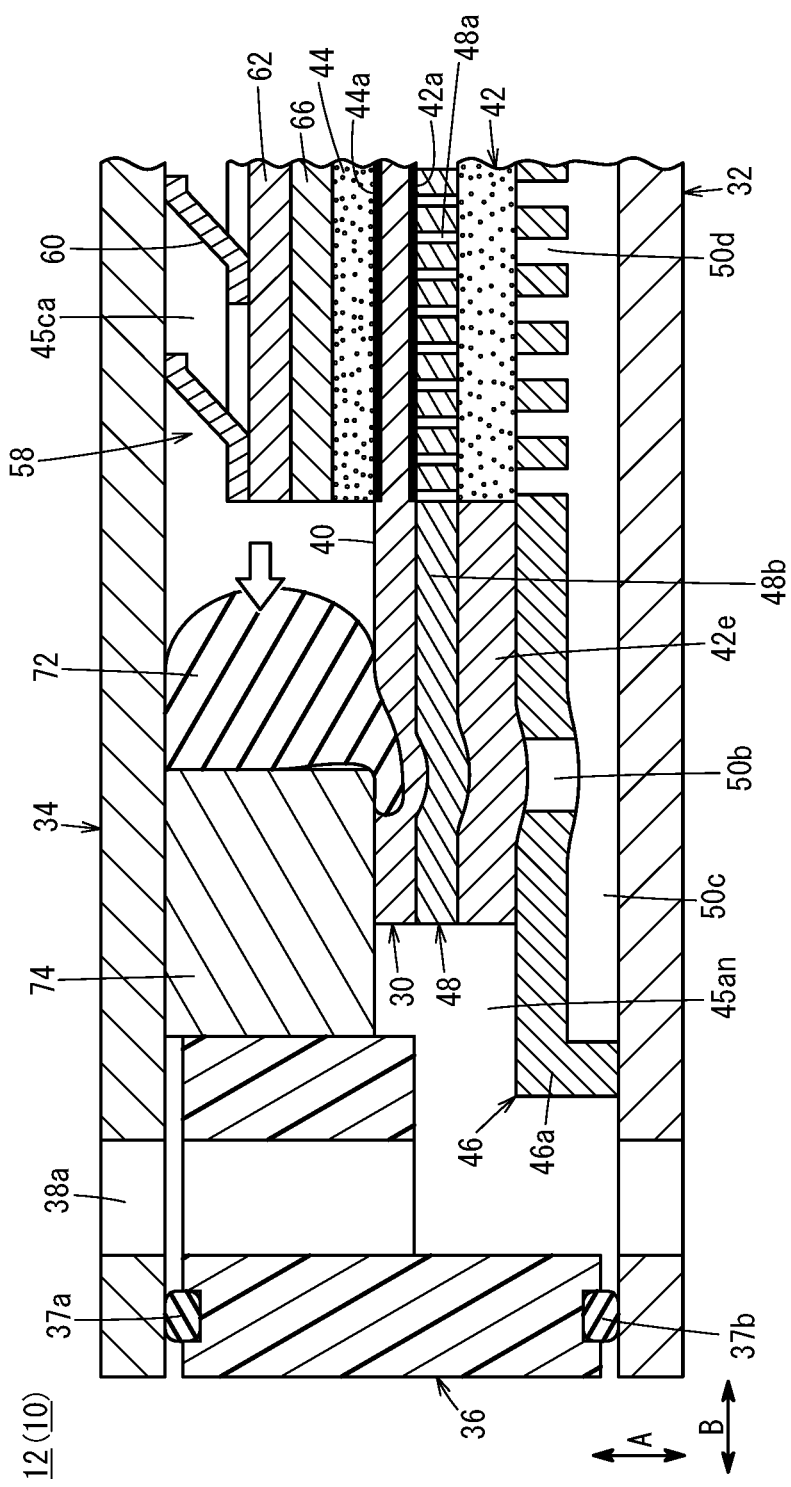
FIG. 6 is an enlarged cross-sectional view of principal parts showing a state in which the large o-ring (seal member) is pressed and compressed from the side of an inner circumferential wall thereof, in a high pressure water electrolysis cell in which a distributing path and a converging path are arranged so as to overlap with an opposing position where the large o-ring as the seal member and the pressure resistant member face toward each other.

As shown in FIG. 6, a case is assumed in which, as viewed in a cross section of the high pressure water electrolysis cells 12 perpendicular to the stacking direction (sandwiching direction), the distributing path 50b and the converging path 50e overlap with the opposing position where the large o-ring 72 and the pressure resistant member 74 face toward each other. It should be noted that in FIG. 6, only the distributing path 50b is shown.

In this case, since a pressing force in the normal direction toward the electrolyte membrane 40 caused by the large o-ring 72, which is pressed from the inner circumferential side thereof by the high pressure hydrogen, acts on the thin-walled portion of the distributing path 50b, a state occurs in which it is easy for the frame portion 42e and the protective sheet member 48 in a vicinity directly above the distributing path 50b to be bent or deflected locally. Since the electrolyte membrane 40 is a thin membrane and is relatively soft, due to localized deflection of the frame portion 42e and the protective sheet member 48, the contact surface pressure of the electrolyte membrane 40 tends to decrease at a location immediately underneath the opposing position where the large o-ring 72 and the pressure resistant member 74 face toward each other.

As can be appreciated from the above, since the distributing path 50b or the converging path 50e is a thin-walled portion formed to penetrate through the water flow passage member 46, a sufficient reactive force cannot be exhibited thereby with respect to pressing against the electrolyte membrane 40 by the large o-ring 72. Accordingly, the above-described bending or deflection occurs relatively easily. As a result, the contact surface pressure between the electrolyte membrane 40 and the pressure resistant member 74 decreases.

Since the large o-ring 72 is made of rubber or the like, it is comparatively soft. Therefore, when the contact surface pressure decreases, it becomes easy for a portion of the outer circumferential wall of the large o-ring 72 to enter into the region where the contact surface pressure has been lowered. Stated otherwise, it becomes easy for a portion of the large o-ring 72 to protrude between the electrolyte membrane 40 and the pressure resistant member 74.

In such a state, the seal becomes insufficient. Further, when generation of hydrogen is stopped and the side on the inner circumferential wall of the large o-ring 72 is returned to normal pressure by depressurizing, to be described later, the protruding portion of the large o-ring 72 may be pealed off. When such a situation occurs, the large o-ring 72 ends up being damaged.

In contrast thereto, according to the present embodiment, as described above, both of the distributing path 50b and the converging path 50e are offset from the opposing position where the large o-ring 72 and the pressure resistant member 74 face toward each other, and are positioned outwardly of the opposing position (see FIG. 5). In addition, the distributing path 50b and the converging path 50e are located more outwardly than the outer circumferential edge portion of the membrane electrode assembly 30. Therefore, the upper surface of the water flow passage member 46 is positioned below the opposing position. The anode power feeding body 42, the protective sheet member 48, and the electrolyte membrane 40 are supported by the upper surface.

Accordingly, bending or deflection of the anode power feeding body 42, the protective sheet member 48, and the electrolyte membrane 40 is suppressed. Therefore, lowering of the contact surface pressure between the electrolyte membrane 40 and the pressure resistant member 74 is prevented. Consequently, the large o-ring 72 is prevented from entering (being pushed out) in between the electrolyte membrane 40 and the pressure resistant member 74.

When operation of the differential pressure type high pressure water electrolysis apparatus 10 is stopped, in order to eliminate a pressure difference between the anode chamber 45an on a side at a low pressure (normal pressure) and the cathode chamber 45ca on a side where the pressure is high, a pressure reduction (depressurizing) process is performed in the cathode chamber 45ca. As a result, the large o-ring 72 expands and returns to its original shape, together with moving to its original position. At this time, it is easy for the outer circumferential wall of the large o-ring 72 to be moved inwardly in the diametrical direction, or stated otherwise, to be returned to its original shape. This is because, when hydrogen is generated, the outer circumferential wall of the large o-ring 72, which is pressed against the inner circumferential wall of the pressure resistant member 74, is prevented from entering (being pushed out) into a clearance between the electrolyte membrane 40 and the pressure resistant member 74.

Accordingly, when depressurizing of the cathode is carried out, it is possible to avoid a situation in which a protruding portion of the large o-ring 72 is pealed off, or in other words, to avoid damage from occurring to the large o-ring 72. Therefore, a sufficient sealing ability can be obtained by the large o-ring 72.

The present invention is not particularly limited to the embodiment described above, and various modifications can be adopted therein within a range that does not depart from the essence and gist of the present invention.

For example, the distributing path 50b and the converging path 50e may be offset more inwardly than the opposing position where the large o-ring 72 and the pressure resistant member 74 face toward each other.

What is claimed is:

1. A water electrolysis apparatus, comprising:
an anode side separator;
a cathode side separator;
a membrane electrode assembly constituted by providing an anode electrode catalyst layer and a cathode electrode catalyst layer on an electrolyte membrane, and which is positioned between the anode side separator and the cathode side separator;
an anode power feeding body adapted to apply electric power to the anode electrode catalyst layer;
a cathode power feeding body adapted to apply electric power to the cathode electrode catalyst layer;
a seal member sandwiched between the cathode side separator and the membrane electrode assembly, and surrounding the cathode electrode catalyst layer; and
a pressure resistant member that surrounds the seal member from an outer side thereof;
the water electrolysis apparatus further comprising a flow passage forming member in which there are formed a water receiving section adapted to receive water supplied from the exterior, a plurality of supply passages adapted to individually supply the water to the anode electrode catalyst layer, a distributing path joined to the water receiving section and the plurality of supply passages, and adapted to distribute the water to the plurality of supply passages, a water discharging section adapted to discharge unelectrolyzed water to the exterior, and a converging path joined to the plurality of supply passages (50c, 50d) and the water discharging section, and adapted to converge the unelectrolyzed water;
wherein the distributing path extends along a stacking direction along which the water receiving section and the membrane electrode assembly are stacked,
the converging path extends along the stacking direction along which the water discharging section and the membrane electrode assembly are stacked,
the distributing path and the converging path are disposed at positions offset outward from the seal member in a direction perpendicular to the stacking direction, when viewed in a cross section perpendicular to a direction in which the membrane electrode assembly is sandwiched by the anode side separator and the cathode side separator of the water electrolysis apparatus.

2. The water electrolysis apparatus according to claim 1, wherein the distributing path and the converging path are located more outwardly than a position where the seal member and the pressure resistant member face toward each other.

3. The water electrolysis apparatus according to claim 1, wherein the distributing path and the converging path are located more outwardly than an outer circumferential edge portion of the membrane electrode assembly.

4. The water electrolysis apparatus according to claim 1, wherein the distributing path and the converging path are formed in an arcuate shape.

* * * * *